United States Patent
Duan

(10) Patent No.: US 7,336,847 B2
(45) Date of Patent: Feb. 26, 2008

(54) TEXTURE ERROR RECOVERY METHOD USING EDGE PRESERVING SPATIAL INTERPOLATION

(75) Inventor: Dongpu Duan, Nanjing (CN)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 716 days.

(21) Appl. No.: 10/711,878

(22) Filed: Oct. 11, 2004

(65) Prior Publication Data

US 2006/0078221 A1   Apr. 13, 2006

(51) Int. Cl.
*G06K 9/40* (2006.01)
*G06K 9/32* (2006.01)
*G06K 9/36* (2006.01)

(52) U.S. Cl. .................... 382/266; 382/300

(58) Field of Classification Search ........... 382/166, 382/172, 181, 199, 254, 256, 266, 260–264, 382/269, 284, 285, 300; 345/419, 582; 375/240.15, 375/E7.081
See application file for complete search history.

(56) References Cited

U.S. PATENT DOCUMENTS

| | | | | |
|---|---|---|---|---|
| 5,204,920 A | * | 4/1993 | Moran et al. | 382/166 |
| 5,896,176 A | * | 4/1999 | Das et al. | 375/240.15 |
| 6,035,067 A | * | 3/2000 | Ponticos | 382/226 |
| 6,760,488 B1 | * | 7/2004 | Moura et al. | 382/285 |
| 7,068,722 B2 | * | 6/2006 | Wells | 375/240.16 |
| 7,120,308 B2 | * | 10/2006 | Guleryuz | 382/254 |
| 7,260,269 B2 | * | 8/2007 | Guleryuz | 382/274 |
| 2006/0078221 A1 | * | 4/2006 | Duan | 382/266 |
| 2006/0244757 A1 | * | 11/2006 | Fang et al. | 345/582 |

* cited by examiner

*Primary Examiner*—Amir Alavi
(74) *Attorney, Agent, or Firm*—Winston Hsu

(57) ABSTRACT

A method of recovering texture information for an error block in a video stream includes applying an edge detection spatial filter on blocks surrounding an error block to detect texture edges, each block containing a plurality of pixels, and identifying first pixels surrounding the error block having texture data above a predetermined threshold value, selecting first pixels and checking the texture data of pixels extending from the selected first pixel in a plurality of predetermined directions for determining a direction of the texture edge, accumulating the edge detection filtering results of pixels that are located on the texture edge in a selected direction, determining the filtering weights corresponding to each direction of the texture edge based on the filtering results of pixels checked in the predetermined directions, and reconstructing the texture of the error block in the spatial domain using weight filtering based on the texture data of surrounding pixels.

13 Claims, 2 Drawing Sheets

TEXTURE ERROR RECOVERY METHOD USING EDGE PRESERVING SPATIAL INTERPOLATION

BACKGROUND OF INVENTION

1. Field of the Invention

The present invention relates to a method of recovering texture data in video streams, and more specifically, to a method of recovering texture data for error blocks in video streams using spatial interpolation.

2. Description of the Prior Art

Video streams are composed of many macro blocks. It is inevitable that some of the blocks in a video stream may have errors when transmitting. The macro blocks containing errors are referred to as error blocks. Methods have been developed for reconstructing error blocks in order to clean up the video signal. The blocks surrounding the error block are analyzed, and the error block is reconstructed to be similar to the surrounding blocks. Each block contains a plurality of pixels. For the following disclosure, it will be assumed that each block is a set of 16×16 pixels.

Please refer to FIG. 1. FIG. 1 is a diagram of a video frame 5 containing an error block 10. The error block 10 is shown in the video frame 5, surrounded by other blocks 12. The prior art method of reconstructing the error block 10 contains several steps. First of all, the method calculates a gradient for each pixel in the surrounding blocks 12. Thereafter, the texture edge is detected by comparing the pixel gradients to a threshold level. The gradient directions of the pixels in the surrounding blocks 12 fall into eight classes, which are illustrated in FIG. 2. Eight surrounding pixels 20 in FIG. 2, which are labeled 0 to 7, present eight different directions extending from a central pixel 15. Each of these eight directions covers an angle area of 22.5 degrees. For each of the pixels in surrounding blocks, the texture edge extending direction of one pixel can be calculated using its gradient direction. If the texture edge extending direction runs through the error block 10, a counter corresponding to that direction will be accumulated with the gradient magnitude of the pixel. Once the texture edge extension has been calculated for each of the pixels in the four surrounding blocks, the counter totals are used in calculating filtering weights. The error block 10 is then reconstructed by weight filtering its surrounding boundary pixels from blocks 12. The filtering weights correspond to the eight edge extending directions and further to the eight pixels shown in FIG. 2. To perform the weight filtering, the texture data of the surrounding pixels of the error pixel will be multiplied with corresponding weights and then averaged for the reconstructed result. The weight filtering is performed for each pixel of the error block 10 to reconstruct the whole error block finally.

Unfortunately, the calculating the texture edge extension for each of the 8 sections is complicated and requires heavy computation.

SUMMARY OF INVENTION

It is therefore an objective of the claimed invention to provide a method of interpolating texture information for an error block in a video stream in order to solve the above-mentioned problems.

According to the claimed invention, a method of recovering texture information for an error block in a video stream includes locating an error block, applying an edge detection spatial filter on blocks surrounding the error block to detect texture edges, each block containing a plurality of pixels, generating filtering results of the plurality of pixels, and identifying first pixels surrounding the error block having texture data above a predetermined threshold value. The method also includes selecting first pixels one by one and checking the texture data of pixels extending from the selected first pixel in a plurality of predetermined directions for determining a direction of the texture edge, accumulating the filtering results of pixels that are located on the texture edge in a selected direction using a corresponding counter, determining filtering weights based on the accumulation results of each counter corresponding to the predetermined directions, and reconstructing the texture data of the error block in the spatial domain based on the texture data of surrounding pixels of the error block.

It is an advantage of the claimed invention that checking the texture data of blocks extending from the first pixels in the plurality of predetermined directions is simplified in the present invention for reducing complexity of the texture recovery operation and for reducing the number of calculations required. The claimed invention does not require gradients to be calculated, and thereby requires fewer overall calculations be performed.

These and other objectives of the present invention will no doubt become obvious to those of ordinary skill in the art after reading the following detailed description of the preferred embodiment that is illustrated in the various figures and drawings.

DETAILED DESCRIPTION

The present invention method of recovering texture data for error blocks in video streams using spatial interpolation starts out by identifying error blocks. This identification can be performed using any of the prior art identification methods. Once an error block has been identified, a matrix is applied to the four surrounding blocks for filtering the surrounding blocks with an edge detection spatial filter. Although many different matrices could be applied, matrix M is shown below as an example.

$$M = \begin{bmatrix} -1 & -1 & -1 \\ -1 & 8 & -1 \\ -1 & -1 & -1 \end{bmatrix}$$

A threshold is set to detect the texture edge by only considering pixels whose filtering results are above a threshold value. As an example, the threshold may be set equal to 64.

Figure 1:
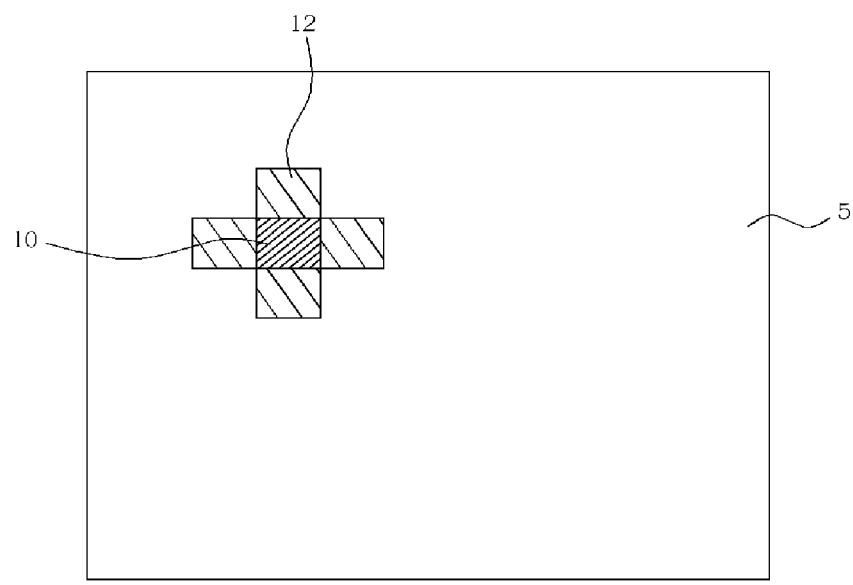
FIG. 1 is a diagram of a video frame containing an error block.
Figure 2:
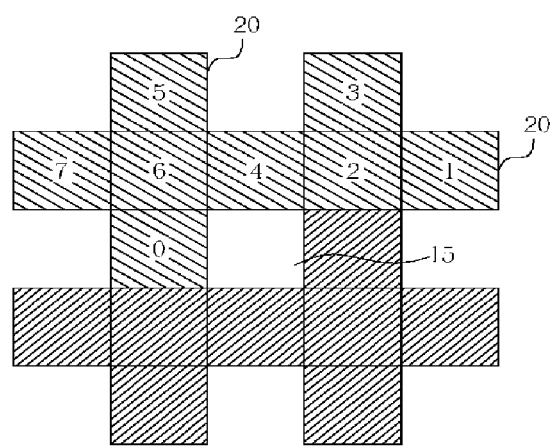
FIG. 2 presents the relationship between the surrounding pixels of the error pixel with the edge extending directions.
Figure 3:
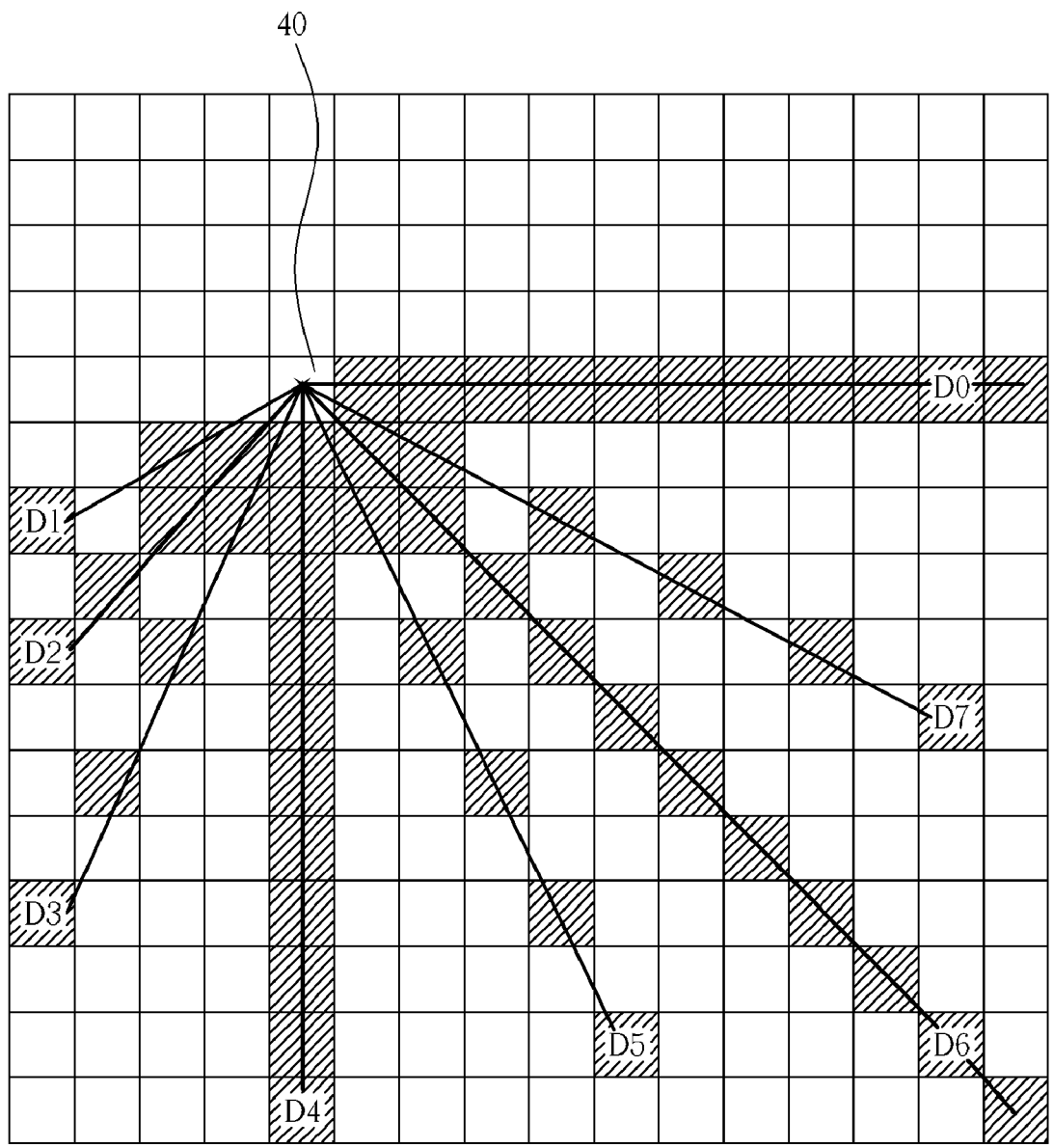
FIG. 3 illustrates checking texture edges in a plurality of directions according to the present invention.

Please refer to FIG. 3. FIG. 3 illustrates checking texture edges in a plurality of directions according to the present invention. After the pixels with its filtering result above the threshold have been calculated, the texture edge pixels are checked one by one in eight different directions D0-D7 to determine if other pixels in that direction also lie on the texture edge. Pixels are checked one at a time from left to right in a row. Once a row is completed, the next row down is checked until the pixels in all of the rows have been checked. As shown in FIG. 3, a current pixel 40 is the texture edge pixel currently being checked. The eight directions D0-D7 extend to the right of the current pixel 40 or down from the current pixel 40. None of the eight directions D0-D7 extend directly to the left of the current pixel 40 or up from the current pixel 40. This is because pixels above the current pixel 40 or directly to the left of the current pixel 40 have already been checked by previous iterations.

In a preferred embodiment of the present invention, eight directions D0-D7 are used, where a 22.5-degree angle separates adjacent directions. There is still a limiting condition, however. The checking on the directions Dx (x=0, 1, . . . 7) should be skipped if the edge extending on this direction cannot go through the error block area.

As mentioned above, the eight directions are used to determine if other pixels in those directions also lie on the texture edge. To avoid repeated calculations, a group of flags can be used to record whether groups of pixels have already been checked in a specified direction. If the flag indicates that all pixels in that direction have already been checked, those pixels do not need to be checked again.

In order to reduce spatial noise, the checking of texture edge pixels in a specific direction will be stopped if a predetermined number of consecutive pixels are found not to be on the texture edge. For strictly reducing noise, the predetermined number of consecutive pixels is set to be a low number. For example in directions D0, D2, D4, and D6, the predetermined number of consecutive pixels can be set as 2 pixels. For directions D1, D3, D5, and D7, the predetermined number of consecutive pixels can be set as 1 pixel. For less strictly reducing noise, the number of consecutive pixels can be set to larger numbers. As a result, if the current pixel 40 is an isolated edge pixel, which means no pixel is found on the texture edge after checking for this pixel, the pixel 40 will be thought as a noise pixel and not considered in subsequent process.

In general, once the eight directions extending from the current pixel 40 have been checked, the filtering results of texture edge pixels located on that direction would be accumulated with a counter corresponding to that direction.

Based on the accumulation results, the filtering weights corresponding to the eight edge extending directions can be calculated. Thereafter, the texture of the error block is reconstructed similarly using the same weight filtering as that in the prior art. By the reconstruction of the texture of the error block, the overall quality of the video stream will be improved, and will look less noisy.

In contrast to the prior art, the present invention does not require gradients to be calculated, and thereby requires fewer overall calculations be performed.

Checking the texture data of blocks extending from the current pixel in the plurality of predetermined directions is simplified in the present invention for reducing complexity of the texture recovery operation and for reducing the number of calculations required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of recovering texture information for an error block in a video stream, the method comprising:

locating an error block;

applying an edge detection spatial filter on blocks surrounding the error block to detect texture edges, each block containing a plurality of pixels;

generating filtering results of the plurality of pixels;

identifying first pixels surrounding the error block having texture data above a predetermined threshold value;

selecting first pixels one by one and checking the texture data of pixels extending from the selected first pixel in a plurality of predetermined directions for determining a direction of the texture edge;

accumulating the filtering results of pixels that are located on the texture edge in a selected direction using a corresponding counter;

determining filtering weights based on the accumulation results of each counter corresponding to the predetermined directions; and reconstructing the texture data of the error block in the spatial domain based on the texture data of surrounding pixels of the error block.

2. The method of claim 1, further comprising after checking the texture data of pixels extending from one of the first pixels in a selected direction, setting a flag corresponding to the selected direction to indicate that the selected direction has already been checked.

3. The method of claim 2, further comprising skipping checking the texture data of pixels in the selected direction if the flag corresponding to the selected direction has already been set.

4. The method of claim 1, wherein the texture data is checked for pixels in eight different directions.

5. The method of claim 4, wherein a 22.5-degree angle separates adjacent directions.

6. The method of claim 1, wherein selecting first pixels one by one comprises selecting successive first pixels in a row one by one from left to right, and then checking successive rows from top to bottom.

7. The method of claim 6, wherein each of the predetermined directions extends below or to the right of the selected first pixel.

8. The method of claim 1, further comprising stopping checking the texture data of pixels in the selected direction if a predetermined number of consecutive pixels are not located on the texture edge.

9. The method of claim 8, wherein the predetermined number of consecutive pixels is equal to 1.

10. The method of claim 8, wherein the predetermined number of consecutive pixels is equal to 2.

11. The method of claim 1, wherein the edge detection spatial filter applied to the blocks surrounding the error block is defined by the matrix $$M = \begin{bmatrix} -1 & -1 & -1 \\ -1 & 8 & -1 \\ -1 & -1 & -1 \end{bmatrix}.$$

12. The method of claim 1, wherein the predetermined threshold value is equal to 64.

13. The method of claim 1, wherein the error block is reconstructed by weight filtering the texture data of the surrounding pixels of the error block.